May 25, 1954 M. I. JACOB ET AL 2,679,581
ANTENNA TUNING SYSTEM
Filed May 20, 1950
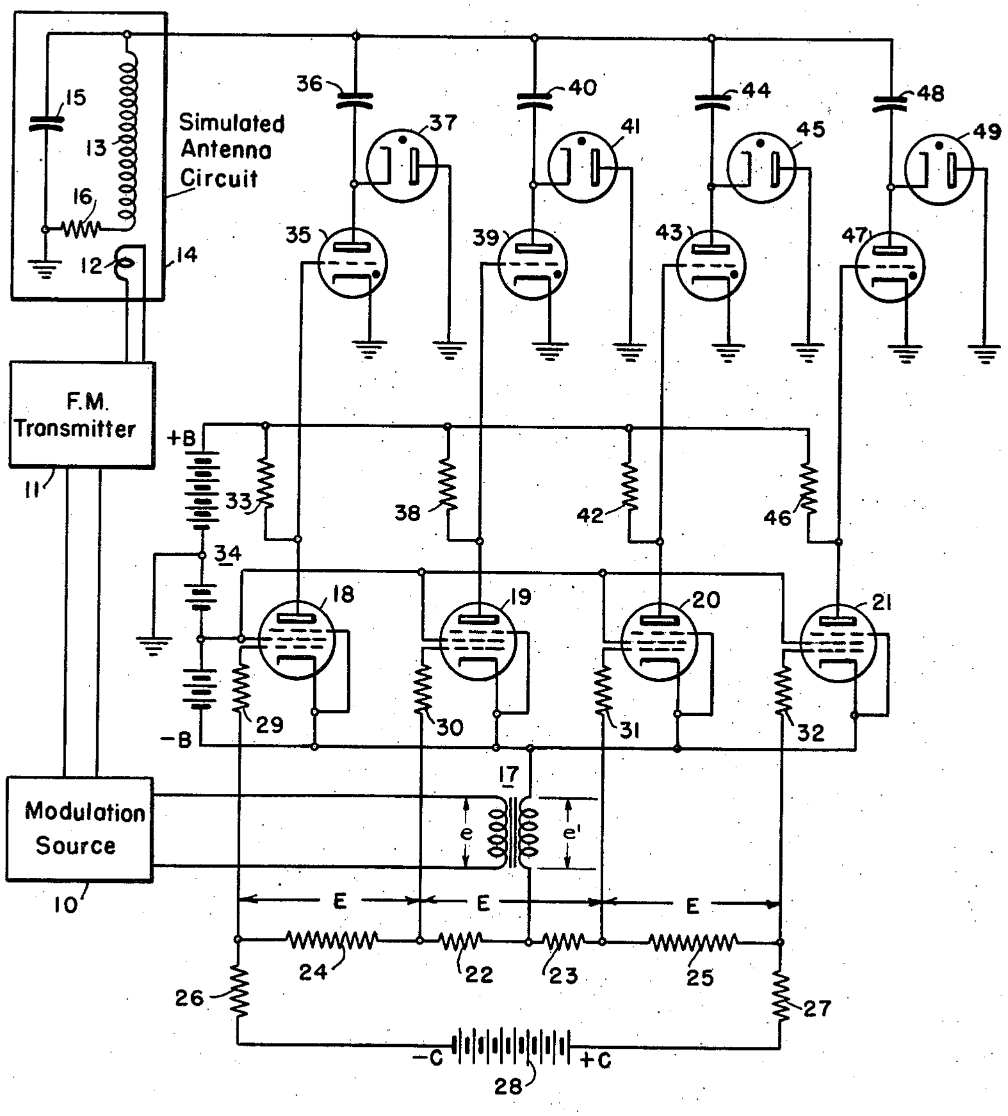
WITNESSES:
E. A. McCloskey
Wm. C. Groome
INVENTORS
Robert J. Howell and
Mark I. Jacob.
BY F. E. Browder
ATTORNEY Patented May 25, 1954 2,679,581

UNITED STATES PATENT OFFICE 2,679,581

ANTENNA TUNING SYSTEM

Mark I. Jacob, Baltimore, and Robert J. Howell, Catonsville, Md., assignors to Westinghouse Electric Corporation, East Pittsburgh, Pa., a corporation of Pennsylvania Application May 20, 1950, Serial No. 163,128

5 Claims. (Cl. 250—17)

This invention relates to low frequency, frequency modulated, radio transmitters, and relates more particularly to circuits for tuning the antenna circuit of such a transmitter to the instantaneous transmitter frequency.

For such duties as military communications where dependability is of prime importance, very low frequencies of the radio spectrum are used since the ground waves in which the energy is transmitted are but slightly subject to fading and to daily and seasonal variations. The main difficulties encountered in the use of such frequencies have involved the high Q factor for antennas of reasonable size. This is for the reason that when the frequency of a driving signal is suddenly changed, the circulating current in a driven circuit consists of a signal at the original frequency which is decaying exponentially from the moment of frequency change, and a signal at the new frequency which builds up exponentially at the same moment. In high Q, low frequency circuits, the time required for new equilibrium conditions to be established following each frequency change, may be so long as to approach the modulation rate, or in frequency shift keyed, telegraph systems, the time of a mark or space signal, requiring a decrease in the modulation rate, or in the keying speed, for avoiding distortion in the transmitted signals.

Such difficulties may be overcome by maintaining the antenna resonant frequency the same as the instantaneous transmitter frequency as broadly disclosed in the C. E. McClellan application, Serial No. 58,064, filed November 3, 1948.

This invention provides for maintaining an antenna of a transmitter at the instantaneous transmitter frequency by switching a series of capacitors in and out of the antenna circuit so that each additional capacitor added to the circuit lowers the resonant frequency of the antenna by a definite frequency increment $\Delta f$, and that each capacitor removed from the circuit increases the resonant frequency by the same increment. The signal modulating the transmitter raises and lowers the frequency of the transmitter above or below a definite center frequency and controls the switching sequence of the capacitors in such a manner that the antenna is held at a definite resonant frequency $f_1$, while the instantaneous frequency of the transmitter varies in the range $$f_1 \pm \frac{\Delta f}{2}$$

When the modulating signal lowers the transmitter frequency below this range, another capacitor is switched across the antenna circuit, tuning it to a lower frequency $f_2$ which equals which equals $f_1 - \Delta f$. The antenna will remain at the resonant frequency $f_2$ only while the transmitter is within the range $$f_2 \pm \frac{\Delta f}{2}$$

and so on in such a manner that the antenna remains tuned to the transmitter frequency within the range $$\pm \frac{\Delta f}{2}$$

Preferably, the capacitors are connected in and out of the antenna circuit by thyratrons which are caused to conduct by sharp cut-off, pentode control tubes, each of which responds to a different level, signal voltage.

In one embodiment of the invention, where $N$=the number of capacitors to be switched in and out of the antenna circuit.

$f_0$=the center frequency of the transmitter and the antenna resonant frequency.

$\Delta f$=the incremental change of antenna resonant frequency.

$e$=the instantaneous modulation signal voltage.

$\frac{\Delta f}{\Delta e}$=the deflection sensitivity of the transmitter, and $e_g$=the mid-point of a range of grid voltage necessary to shift the control tubes from saturation to cut-off. This range is a small portion of the maximum variation in grid voltage.

The capacitors are each connected in series with a thyratron which is so connected to a pentode control tube that its cathode is negative and its plate is positive with respect to the thyratron cathode. When a pentode draws saturation plate current, the control grid of its associated thyratron is sufficiently negative to cut the thyratron off, and when a pentode is cut-off, sufficient positive voltage is applied to the control grid of its associated thyratron to cause it to conduct.

For N stages, where N is an even integer, the fixed bias applied to the $n$th control tube will be $$e_g + \frac{\Delta e}{2} + \left(\frac{N}{2} - n\right)\Delta e$$

Thus, for four stages the control tubes will have fixed bias as follows:

| Tube | Fixed Bias Voltage |
|---|---|
| #1 | $e_o+3/2\Delta e$ |
| #2 | $e_o+1/2\Delta e$ |
| #3 | $e_o-1/2\Delta e$ |
| #4 | $e_o-3/2\Delta e$ |

The signal voltage $e$ is applied in series with a fixed bias voltage to the pentode grids. A signal voltage of polarity and magnitude sufficient to cause the transmitter frequency to vary in the range $f_n \pm \Delta f$, will, if the antenna resonant frequency is above or below $f_n$, cause a capacitor to be switched in or out of the antenna circuit for maintaining the antenna resonant frequency at $f_n$.

Signal distortion introduced by this system is a function of the number of stages used. Experiments so far have indicated that for sine wave modulation signals up to 25% distortion is present in three steps, 10% distortion is present in seven steps, and 7% distortion is present in eleven steps. Voice transmission is excellent when volume compression of the voice signal is employed so that low level but high intelligence signals are sufficiently large to cause the resonant frequency of the antenna circuit to be shifted. Facsimile signals can be transmitted with excellent results, best results being obtained by adjusting the stepped antenna resonant frequencies to correspond to the instantaneous transmitter frequency which represents the signal levels of the picture shadings desired. Frequency shift keying can be satisfactorily accomplished.

Among the advantages of this invention is that its capacitive method of tuning is more efficient than inductive methods. Capacitors having less loss than transformers can be more readily obtained. The capacitor type of circuit is simpler and in less susceptible to transients caused by the sudden firing of the thyratrons.

An object of this invention is to maintain a tuned circuit at the frequency of a variable frequency driving signal by switching capacity in and out of the circuit.

Another object of this invention is to vary the resonant frequency of a tuned circuit in accordance with changes in the frequency of a driving signal by switching capacity in and out of the circuit.

Another and more specific object of this invention is to maintain an antenna of a frequency modulated, radio transmitter tuned to the instantaneous frequency of the transmitter by switching capacitors in and out of the antenna circuit.

The invention will now be described with reference to the drawing, the figure of which is a circuit schematic of one embodiment thereof.

The modulation source 10 is connected to the frequency modulation transmitter 11, which is coupled through the coupling inductor 12 to the inductor 13 of the antenna circuit 14. The inductor 13 is tuned by the capacitor 15 which is connected at one side to one end of the inductor 13, and is connected at its other side through the resistance 16 to the other end of the inductor 13, and to ground. The antenna circuit 14 is a high Q, relatively low frequency and relatively high power circuit.

The modulation source 10 is also connected to the primary winding of the transformer 17, the secondary winding of which is connected at one side to the interconnected cathodes of the pentode, sharp cut-off, control tubes 18, 19, 20 and 21, and at its other side to the junction point of the series-connected resistors 22 and 23, which are connected in series with the resistors 24 and 25, which in turn are connected through the resistors 26 and 27 to the terminals of the negative bias voltage source 28 illustrated symbolically as a battery. The instantaneous modulation signal voltage $e$ is applied to the primary of the transformer 17 and a voltage $e'$ appears across its secondary.

The control grid of the tube 18 is connected through the grid resistor 29 to the junction point of the resistors 24 and 26. The control grid of the tube 19 is connected through the grid resistor 30 to the junction point of the resistors 24 and 22. The control grid of the tube 20 is connected through the grid resistor 31 to the junction point of the resistors 23 and 25. The control grid of the tube 21 is connected through the grid resistor 32 to the junction point of the resistors 25 and 27.

The plate of the tube 18 is connected through the load resistor 33 to a maximum voltage, positive terminal of the plate voltage supply source 34, and to the grid of the thyratron 35.

The cathode of the thyratron 35 is grounded, and its plate is connected through the capacitor 36 to the ungrounded end of the antenna inductor 13. The cathode of the gas-filled diode tube 37 is connected to the plate of the thyratron 35, and its plate is grounded.

The plate of the tube 19 is connected through the load resistor 38 to the maximum voltage, positive terminal of the source 34, and to the grid of the thyratron 39.

The cathode of the thyratron 39 is grounded, and its plate is connected through the capacitor 40 to the ungrounded end of the antenna inductor 13. The cathode of the gas-filled diode tube 41 is connected to the plate of the thyratron 39, and its plate is grounded.

The plate of the tube 20 is connected through the load resistor 42 to the maximum voltage terminal of the source 34, and to the grid of the thyratron 43.

The cathode of the thyratron 43 is grounded, and its plate is connected through the capacitor 44 to the ungrounded end of the antenna inductor 13. The cathode of the gas-filled diode tube 45 is connected to the plate of the thyratron 43, and its plate is grounded.

The plate of the tube 21 is connected through the load resistor 46 to the maximum voltage terminal of the source 34, and to the grid of the thyratron 47.

The cathode of the thyratron 47 is grounded, and its plate is connected through the capacitor 48 to the ungrounded end of the antenna inductor 13. The cathode of the gas-filled diode tube 49 is connected to the plate of the thyratron 47, and its plate is grounded.

The plate circuits of the thyratrons are supplied with alternating current through their connection to the antenna inductor 13. They conduct when their grids are sufficiently positive and their plates are positive. The diode tubes 37, 41, 45 and 49 serve to discharge the tuning capacitors 36, 40, 44, and 48 by conducting on the negative half cycle which permits the deionization of the thyratrons to which they are connected after firing.

The suppressor grids of the tubes 18, 19, 20 and 21 are tied to their respective cathodes, and their screen grids are interconnected and connected to an intermediate voltage terminal of the source 34, the source 34 being grounded at a point between that terminal and the maximum voltage terminal, whereby the screen grids of the tubes 18, 19, 20 and 21 are positive with respect to their cathodes which are connected to the negative terminal of the source 33, and are negative with respect to ground.

The cathodes of the control tubes 18, 19, 20 and 21 are negative, and their plates are positive with respect to the corresponding thyratron tubes 35, 39, 43 and 47 respectively. Thus, when a control tube draws saturation current, the voltage drop at its plate lowers the grid of the corresponding thyratron to the cut-off voltage of the thyratron, and when a control tube is cut-off, the increase in voltage at its plate provides sufficient positive grid voltage to the corresponding thyratron to cause it to conduct.

When the thyratron 35 conducts, it acts as an electronic switch connecting the capacitor 36 to ground and therefore, connecting its across the antenna inductor 13, thereby lowering the resonant frequency of the antenna. Likewise, when the thyratrons 39, 43 and 47 conduct, they act to connect the capacitors 40, 44 and 48, respectively, across the inductor 13, each additional capacitor so connected, decreasing the resonant frequency of the antenna.

The control grids of the tubes 18, 19, 20 and 21 are biased to different potentials by the bias voltage source 28. The control grid tube 18 is biased by a voltage E more negatively than that of the tube 19, the control grid of the tube 19 is biased by the same voltage E more negatively than that of the tube 20, and the control grid of the tube 20 is biased by the same voltage E more negatively than that of the tube 21.

The bias voltage for the tube 18 is $e_g+3/2\Delta e$; the bias voltage for the tube 19 is $e_g+1/2\Delta e$; the bias voltage for the tube 20 is $e_g-1/2\Delta e$; and the bias voltage for the tube 21 is $e_g-3/2\Delta e$ where $e_g$ is the grid bias point where the tubes go from cut-off substantially to saturation, and $\Delta e$ is the incremental change of modulation signal voltage.

Thus, the tubes 18 and 19 are biased different voltages below cut-off, while the tubes 20 and 21 are biased different voltages above cut-off. The thyratrons 35 and 39 associated with the control tubes 18 and 19 normally conduct while the thyratrons 43 and 47 associated with the control tubes 20 and 21 normally are non-conducting. The capacitors 36 and 40 associated with the thyratrons 35 and 39 normally are connected across the inductor 13, while the capacitors 44 and 48 associated with the thyratrons 43 and 47 normally are disconnected from across the inductor 13.

The modulation source 16 applies signal voltages through the transformer 17 between the cathodes of the control tubes 18, 19, 20 and 21 and their control grids, which is in series with the bias voltages. At a given modulation signal reference level, which for the purpose of illustration may be assumed to be the zero modulation level, at which level the transmitter operates at its assigned center frequency, the tubes 20 and 21 conduct, while the tubes 18 and 19 are non-conducting. A first predetermined increase in positive signal voltage above the zero level will cause the control tube 19 which is biased the least below cut-off, to conduct. This will result in an increase in the voltage at its plate and at the grid of its associated thyratron 39, causing the thyratron 39 to cease conducting when its plate goes negative, and to disconnect its associated capacitor 40 from the antenna circuit, thereby raising the antenna resonant frequency. A further predetermined increase in positive signal voltage will cause the control tube 18 to conduct, causing the grid of its associated thyratron 35 to become sufficiently less negative to cause the thyratron 35 to cease conducting, when its plate goes negative, and to disconnect its associated capacitor 36 from the antenna circuit, thereby further raising the antenna resonant frequency.

A first predetermined increase in negative signal voltage will cause the control tube 20 which is biased the least above cut-off, to cut off, the resulting increase in its plate voltage and in the grid voltage of the thyratron tube 43 causing the latter to conduct when its plate is positive, and to connect its associated capacitor 44 in the antenna circuit, thereby lowering the antenna resonant frequency. A further predetermined increase in negative signal voltage will cause the control tube 21 to cut off, the resulting increase in its plate voltage and in the grid voltage of its associated thyratron 47, causing the latter to conduct when its plate is positive, and to connect its associated capacitor 48 in the antenna circuit, thereby further lowering the antenna resonant frequency.

At the same time the modulation source supplies signal voltages to the control tubes, it frequency modulates the transmitter 11, raising and lowering its instananeous frequency. The constants of the circuit components are so chosen that, as referred to previously, each additional capacitor added to the antenna circuit lowers its resonant frequency by a definite frequency increment $\Delta f$, and the antenna is maintained at a definite resonant frequency $f_1$, while the instantaneous frequency of the transmitter varies in the range $f_1\pm\Delta f/2$. When the modulating signal lowers the transmitter frequency below this range, another capacitor is switched across the antenna circuit, tuning it to a lower frequency $f_2$, where $f_2=f_1-\Delta f$.

The antenna resonant frequency $f_2$ will be maintained only while the transmitter operates in the range $f_2\pm\Delta f$. When the modulating signal lowers the transmitter frequency below this range, another capacitor is shunted across the antenna circuit, tuning it to a lower frequency $f_3$, where $f_3=f_2-\Delta f$.

The antenna resonant frequency $f_3$ will be maintained only while the transmitter operates in the range $f_3\pm\Delta f$. When the modulating signal lowers the transmitter frequency below this range, another capacitor is shunted across the antenna circuit, tuning it to a lower frequency $f_4$, where $f_4=f_3-\Delta f$.

Likewise, when the modulating frequency raises the transmitter frequency, first one and then another capacitor will be switched out of the antenna circuit, raising its resonant frequency, first from $f_4$ to $f_3$, then from $f_3$ to $f_2$, then from $f_2$ to $f_1$. More or fewer steps than four could, of course, be provided, according to this invention, depending upon the duty involved.

We claim as our invention:

1. Frequency modulation apparatus comprising a frequency modulation transmitter, an antenna circuit for said transmitter, said circuit including an inductor, a capacitor for lowering the resonant frequency of said circuit when connected across said inductor, an electron tube connected to said inductor and said capacitor for electrically connecting said capacitor across said inductor upon conduction of said tube, a modulation signal source for said transmitter, and means responsive to signals from said source for causing said tube to conduct when said signals cause the frequency of said transmitter to decrease.

2. Frequency modulation apparatus comprising a frequency modulation transmitter, an antenna circuit for said transmitter, said circuit including an inductor, a plurality of capacitors for connection across said inductor for lowering the resonant frequency of said circuit, a plurality of electron tubes, one of said tubes being connected to each of said capacitors and to said inductor for electrically connecting each capacitor across said inductor upon conduction of its associated tube, a modulation signal source for said transmitter, and means responsive to signals from said source for causing said tubes successively to conduct when the signals lower the frequency of said transmitter, and for varying the number of tubes which conduct, in accordance with the magnitude of said signals.

3. Frequency modulation apparatus comprising a frequency modulation transmitter, an antenna circuit for said transmitter, said circuit including an inductor, a capacitor for lowering the resonant frequency of said circuit when connected across said inductor, a gaseous electron tube connected to said capacitor and said inductor for electrically connecting said capacitor across said inductor upon conduction of said tube, a control tube, means biasing said control tube above cut-off, means including said control tube for biasing said gaseous tube below cut-off when said control tube conducts and for biasing said gaseous tube above cut-off when said control tube is cut off, a source of modulation signals for said transmitter, and means responsive to signals from said source for cutting off said control tube when said signals lower the frequency of said transmitter.

4. Frequency modulation apparatus comprising a frequency modulation transmitter, an antenna circuit for said transmitter, said circuit including an inductor, a plurality of capacitors for lowering the resonant frequency of said circuit when connected across said inductor, a gaseous electron tube associated with each of said capacitors, means connecting each said capacitor in series with its associated gaseous electron tube across said inductor, a plurality of control tubes, one connected to each of said gaseous tubes, means for normally biasing said control tubes above cut-off, means including said control tubes for biasing said gaseous tubes below cut-off when said control tubes conduct and for biasing said gaseous tubes above cut-off when said control tubes are cut off, a source of modulation signals for said transmitter, and means responsive to signals from said source for variably cutting off said control tubes in accordance with the magnitude of a signal which lowers the frequency of said transmitter.

5. Frequency modulation apparatus comprising a frequency modulation transmitter having an assigned center frequency, an antenna circuit for said transmitter, said circuit including an inductor, a first and a second plurality of capacitors for lowering the resonant frequency of said circuit when connected across said inductor, a first plurality of gaseous electron tubes, one of said first tubes being connected to each of the capacitors of said first plurality, a second plurality of gaseous electron tubes, one of said second tubes being connected to each of the capacitors of said second plurality, means connecting each said capacitor in series with its associated gaseous electron tube across said inductor, a control tube connected to each of the gaseous tubes of said first plurality of gaseous tubes, a control tube connected to each gaseous tube of said second plurality of gaseous tubes, means including said control tubes for biasing each gaseous tube below cut-off, when it associated control tube conducts and for biasing each gaseous tube above cut-off when its associated control tube is cut off, means for normally biasing said first control tubes above cut-off and for biasing said second control tubes below cut-off, a source of modulation signals for said transmitter, and means responsive to signals from said source for variably cutting off the control tubes of said first plurality in accordance with the magnitude of said signals which lower the frequency of said transmitter below said center frequency, and for variably causing the control tubes of said second plurality to conduct in accordance with the magnitude of said signals which raise the frequency of said transmitter above said center frequency.

References Cited in the file of this patent

UNITED STATES PATENTS

| Number | Name | Date |
|---|---|---|
| 2,077,223 | Crosby | Apr. 13, 1937 |
| 2,388,233 | Whitaker | Oct. 30, 1945 |
| 2,440,081 | Fick | Apr. 20, 1948 |
| 2,480,820 | Hollingsworth | Aug. 30, 1949 |
| 2,559,023 | McCoy | July 3, 1951 |

FOREIGN PATENTS

| Number | Country | Date |
|---|---|---|
| 878,645 | France | Jan. 26, 1943 |